United States Patent Office.

VICTOR G. BLOEDE, OF BROOKLYN, NEW YORK.

Letters Patent No. 112,316, dated March 7, 1871.

IMPROVEMENT IN THE MANUFACTURE OF ROCHELLE SALTS AND BORAX.

The Schedule referred to in these Letters Patent and making part of the same.

*To all whom it may concern:*

Be it known that I, VICTOR G. BLOEDE, of the city of Brooklyn, county of Kings, and State of New York, have invented certain Improvements in the Manufacture of Rochelle Salts and Borax; and I do hereby declare that the following is a full and exact description of the *modus operandi* of my invention.

The nature of my invention consists in getting entirely rid of the large admixture of mechanical and organic impurities contained and suspended in the first or crude solution of Rochelle salts or borax, which is done by a series of simple manipulations in conjunction with blood or albumen.

In order that others skilled in the art may make use of my invention, I will proceed to describe it in detail.

The first solution, obtained by neutralizing the bitartrate of potassa (or boracic acid, as the case may be) by or in a solution of carbonate of soda, is made in the ordinary manner, in a lead-lined wooden vat.

This solution-vat contains two coils of leaden pipe. One coil admits "wet" steam to the solution by perforations along its length; the other is a coil for heating or evaporating the mixture, and exhausts into the air.

The solution having been made in the ordinary manner, *i. e.*, by wet steam, the mixture is allowed to cool until its temperature does not exceed 120° Fahrenheit.

From two to six gallons of fresh blood are then added to every five hundred gallons of lye, (the amount varying, as experience will dictate, according to the amount of impurity the solution contains,) and the whole mass is stirred until the various ingredients are thoroughly and completely mixed. Thereupon the steam is turned on through the heater or closed steam-coil (no wet or free steam being employed) until the liquid is brought to a very slow and easy simmer. The blood coagulates and carries with it a considerable proportion of the suspended impurities.

When a tough and solid scum has been formed upon the surface of the liquid, the former is removed by perforated ladles and thrown upon a fine meshed brass sieve suspended directly over the tank. By these means the scum is drained of considerable of the adhering solution, which flows back into the tank.

When the scum has been thoroughly removed from the surface of the liquid the steam is shut off, and the solution in the tank will be found much clearer than before, although still largely contaminated with impurities.

To effect the final purification of the lye I proceed as follows:

The evaporator is also a lead-lined wooden tank, about half the size of the solution-tank. For convenience sake the two tanks should be placed side by side.

Over the evaporator is suspended a large bag of thick, coarse, filtering felt, into the opening of which a fine-meshed brass sieve is hung in such a manner that it is readily movable.

The half-clarified solution in the first or dissolving-tank is now drawn or pumped upon the wire-screen over the felt-bag. The coarser impurities are collected upon the brass wire, while the finely-divided ones are caught in the felt.

The solution which runs through the felt into the evaporator is now perfectly clear and free from mechanical impurities.

In place of the wire-gauze a simple bag, made of two thicknesses of felt, may be used, but I prefer the gauze-sieve, as it can be readily and frequently removed and emptied, thus preventing effectually any clogging up of the felt, which is difficult and troublesome to clean.

The scum removed from the surface of the lye is treated with some water, poured into bags, and placed under a common press. The murky solution running from the press is added to the crude lye again. The now clear and pure lye in the evaporator is boiled down and crystallized in the ordinary manner, and the subsequent recrystallization and purification are conducted in the ordinary manner and according to the old method.

The advantages of my method over the old system, still exclusively employed by other manufacturers, may be briefly stated, as follows:

According to the old system the first solution of the salt is made very weak, and allowed to stand (the time varying from one to ten days) until all of the heavier impurities have subsided to the bottom.

When the liquid has become clear it is drawn off of the sediment and evaporated, and crystallized and recrystallized until sufficiently pure.

This necessarily involves a considerable amount of apparatus and a long time.

In my process the crude liquid is made much stronger than in the old way, and still is clearer than if allowed to settle for two weeks, and can be boiled down in about half the time.

By my method a better Rochelle salt and a better borax are made in much less than half the time, and at a much cheaper rate, than by any other process now in use. There is also great economy in space and apparatus.

What I claim as my invention, and desire to secure by Letters Patent, is—

The mode herein described for the purification of Rochelle salts or borax-lye by the application of blood, substantially in the manner and for the purpose herein set forth.

VICTOR G. BLOEDE. [L. S.]

Witnesses:
WASHINGTON GODFRY,
CHARLES FROEBEL.